June 18, 1940.  G. I. RHODES  2,204,823
COMPOSITE ELECTRODE FOR PROTECTING BURIED
METALLIC STRUCTURES FROM CORROSION
Filed July 17, 1935
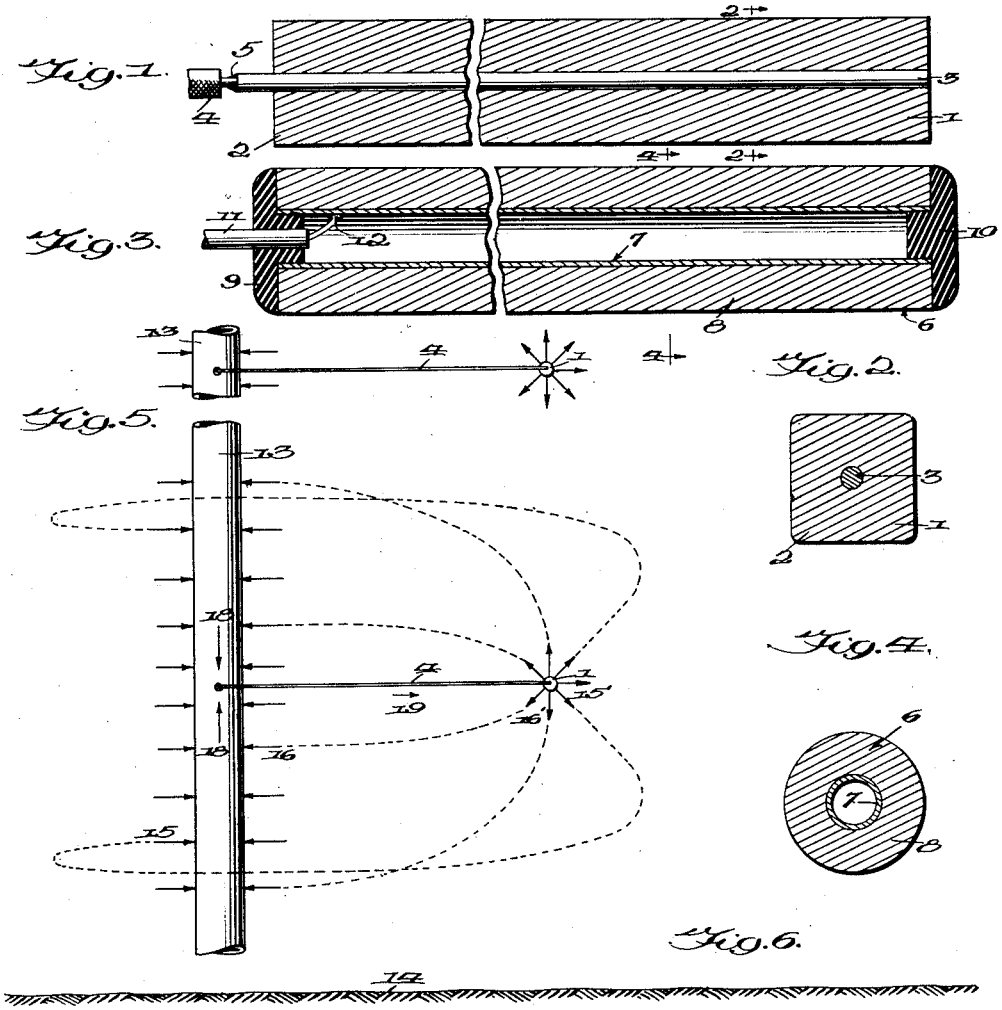
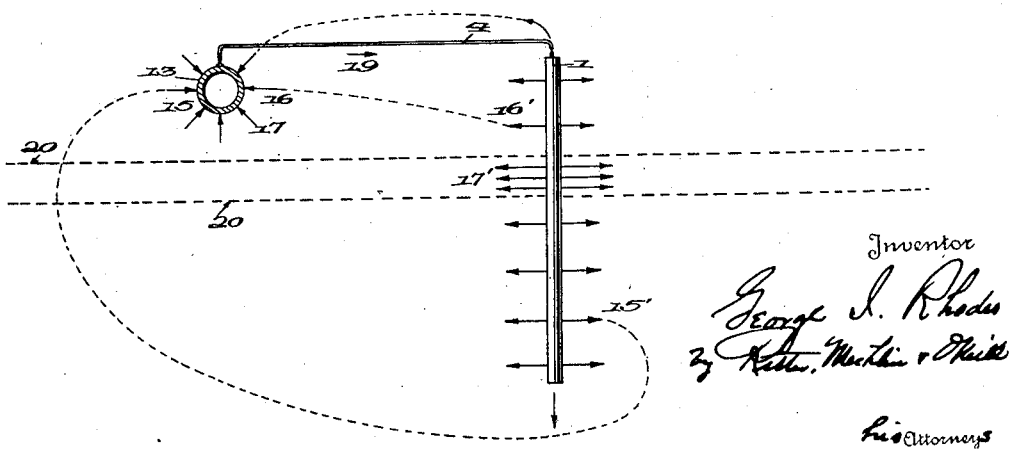

Patented June 18, 1940

2,204,823

UNITED STATES PATENT OFFICE 2,204,823

COMPOSITE ELECTRODE FOR PROTECTING BURIED METALLIC STRUCTURES FROM CORROSION

George I. Rhodes, Glen Ridge, N. J.

Application July 17, 1935, Serial No. 31,950

1 Claim. (Cl. 204—1)

My invention relates to the protection of pipe lines and other buried linear metallic structures from corrosion and is particularly concerned with the production of a composite zinc electrode wherein a large part of the zinc thereof can be effectively utilized for preventing corrosion of the metallic structure to be protected, thereby extending the period of time during which the electrode is effective to prevent corrosion of the structure to be protected, minimizing expense for renewals, and rendering the cathodic protection of buried pipe lines economically feasible.

The primary object of the invention is to produce a composite zinc electrode in which loss of zinc due to non-uniform corrosion is minimized.

A principal feature of the invention consists in forming a composite electrode with an exterior or exposed portion of zinc and an interior portion of metal electrically positive to zinc, the mass of said interior portion being relatively small as compared with the mass of said exterior portion; and a further feature of the invention consists in burying a plurality of such electrodes in the earth adjacent to and distributed along the metallic structure to be protected from corrosion, those portions of the electrodes which are electrically positive to zinc being respectively connected electrically by wires or other metallic connections with the structure to be protected from corrosion.

It is well known that zinc attached to ship's bottoms and to the interior of boilers is useful in preventing corrosion. Similarly, zinc buried in the ground in the vicinity of underground metallic structures and electrically connected thereto is efficacious in preventing the corrosion thereof. In the case of underground metallic structures, which most commonly are of iron, the galvanic electro-motive force of the zinc-iron (or other metal) couple causes electric currents to flow in the zinc to the soil to the iron (or other metal) to wire to zinc circuit. These currents, flowing into the iron or other metal structure to be protected, cause the existence of chemical conditions which inhibit corrosion of the iron, and the same currents flowing out of the zinc induce corrosion of the latter. Different parts of the zinc often corrode at unequal rates. For instance, if the zinc electrode extends through a stratum of soil which is a better conductor of electricity than the remainder of the soil with which it is in contact, corrosion takes place at an increased rate at such stratum with the result that the electrode may become separated into two pieces long before the zinc as a whole has been availed of to prevent the corrosion of the metallic structure to be protected. By my invention such premature and serious losses of zinc are minimized, and zinc anodes may be successfully and economically applied for the prevention of corrosion of buried metallic structures notwithstanding that zinc is a fairly expensive metal and the cost of anodes thereof is an important part of the cost of installation of a system for preventing corrosion in which such anodes are applied.

In the drawing illustrating the invention, the scope whereof is pointed out in the claim:

Figure 1 is a longitudinal sectional view of a composite electrode constructed in accordance with my invention.

Figure 2 is a transverse sectional view of the electrode illustrated in Figure 1.

Figure 3 is a longitudinal sectional view of another preferred form of composite electrode embodying my invention.

Figure 4 is a transverse sectional view of the form of electrode shown in Figure 3.

Figure 5 is a diagrammatic plan view of the electric circuits involved in the use of my composite electrode in protecting a short section of iron pipe forming a part of a buried pipe line.

Figure 6 is a diagrammatic vertical sectional view illustrating the construction shown in Figure 5.

The form of composite zinc electrode 1 shown in Figures 1 and 2 is well adapted for being cheaply cast in open molds. It is formed as a rod, square in cross section, having an exterior portion 2 of zinc and an interior portion 3 of a metal electrically positive to zinc. The interior portion or insert 3 of the electrode is preferably in the form of a centrally disposed wire or rod which may extend outwardly beyond the end of the exterior portion 2. The interior portion 3 is preferably of soft iron, not only because that metal is cheap but also because it is of low galvanic voltage to zinc and is thus generally preferable to copper or brass which are higher in cost and in galvanic electro-motive force; but, although not as desirable, the interior portion or core 3 of the electrode may be made of any metal which is electrically positive to zinc. The exposed or exterior portion 2 of the electrode provides a case or sheath of zinc for the interior portion 3, the mass of the zinc portion 2 being relatively large as compared to that of the interior portion 3 which is formed of the metal electrically positive to zinc.

To the projecting end of the interior portion or core 3 of the electrode an insulated connecting wire 4, preferably of copper, is welded, as indicated at 5. While it is desirable to do so, it is not necessary to insulate the iron core 3 and connecting wire 4 at and adjacent to their point of connection, since the joint between these parts will be protected at the expense of certain very slight losses of zinc. Similarly, the opposite end of the core portion 3 of the electrode may be left unprotected.

In producing, by casting, a composite electrode of the form shown in Figures 1 and 2, a wire of iron, copper or other metal suitable to constitute the core portion 3 of the electrode, is supported in the center of the mold and the zinc is cast about it to form the exterior or casing portion 2. While there is considerable differential shrinkage in cooling, the adhesion between the zinc and the metal of the interior core is close and a satisfactory electrode results. If, in the shrinkage of the zinc on solidifying around the iron or copper core, any microscopic cracks should develop tending to expose the iron or copper in places, the electrode may be advantageously impregnated with paraffin or some like water resisting insulating material which would prevent the water from reaching the interior metallic portion or core 3 through such cracks.

The composite zinc electrode 6 illustrated in Figures 3 and 4 embodies a modified form of my invention which is well adapted for manufacture by electrodeposition in electrolytic zinc refineries. In this form of the invention a thin tube or pipe 7 of steel (or other metal electrically positive to zinc) suitably prepared for electro-galvanizing, is electro-plated with zinc to form the exterior portion of the electrode. The mass of the pipe or tube 7 is small as compared with that of the zinc by which it is encased, the zinc being of any desired thickness and generally in excess of an eighth of an inch. Insulating plugs 9 and 10 are inserted in the respective ends of the interiorly disposed pipe 7, which latter is preferably filled with pitch or other material suitable for preventing the soil water from coming into contact with the steel. An insulated connecting wire 11, which passes through one of the insulating plugs, is electrically connected, as at 12, to the steel pipe 7 in any suitable manner.

While it is apparent that the electrode with the self protecting insert of electro-positive metal may be of various forms and differing dimensions, it has been found desirable to construct it as a rod approximately one inch square or in diameter and four feet long, weighing about twelve pounds. If all the zinc in a composite electrode of such dimensions could be utilized, it would, when buried in the soil at a distance of five feet from a bare underground 12 inch pipe line, provide protection against corrosion for a period of twenty to twenty-five years to approximately five feet of the pipe, and by my invention this desirable result is more or less closely approached.

The zinc employed need not be pure and to minimize expense commercial zinc may be used. For continued success in preventing corrosion of the structure to be protected it is, however, desirable to use a high grade of commercial zinc. Ordinary commercial zinc may contain an aggregate of one percent (1%) or more of lead and of cadmium, whereas high grades of commercial zinc having an aggregate content of substantially 0.1% or less of lead and of cadmium are obtainable at a relatively nominal increase in price.

When ordinary commercial zinc is corroded as an anode, the lead is left behind and when sufficient of the zinc has been removed a greater or less area of the remaining zinc is apt to become coated with the lead and cadmium content of the original zinc electrode. While the zinc-iron galvanic couple produces a voltage of from 300 to 350 milli-volts, the lead-iron galvanic couple produces a voltage of similar intensity but in the opposite direction, with the result that if a sufficient portion of the zinc surfaces become coated with lead there will be a neutralizing effect which may ultimately cause the galvanic voltage between the corroded zinc and the structure to be protected from corrosion to disappear almost completely.

If, however, commercial zinc containing less than 0.1% of lead and cadmium and not exceeding that percentage of lead or of cadmium is used, corrosion of the structure to be protected will be efficiently inhibited for a long period of time because there will be practically no falling off in galvanic voltage due to the zinc becoming coated with lead and/or cadmium. While a cadmium coating on the zinc will not tend to offset or neutralize the zinc-iron voltage, as will a lead coating, nevertheless since the cadmium-iron galvanic couple is of very low voltage any zinc surface upon becoming coated with cadmium is rendered ineffective and accordingly low cadmium content, as well as low lead content, is necessary to insure an efficient electrode of long life. It is advantageous to use commercial zinc wherein the lead and/or cadmium content does not exceed a minor fraction of one percent, because an electrode constructed of commercial zinc containing more than a minor fraction of one percent of lead and/or cadmium declines in efficiency too rapidly to be fully satisfactory economically and in respect to assuring adequate protection against corrosion for a long time; and for especially good results the lead and/or cadmium content of the commercial zinc employed should not be in excess of one-fifth of one percent, and preferably should be less than one-tenth of one percent.

Referring to Figures 5 and 6 which illustrate the use of my composite electrodes as anodes in the cathodic protection of an underground pipe line, 13 indicates a short section of iron pipe buried in corrosive soil, the surface of which is 14. The pipe line is, of course, formed of many such sections in juxtaposition. The composite zinc electrodes, indicated at 1, are pushed into tight fitting bore holes well down in the moist soil, their upper ends being preferably about two feet below the ground's surface so as to be approximately at the level of the pipe line. The electrode is connected to the pipe 13 by an electrical conducting wire, as indicated at 4. When it is of the dimensions heretofore referred to as desirable, each electrode will efficiently protect a section of 12 inch pipe five feet long if located about five feet to one side of the pipe line. Iron pipe is chosen merely for illustration, it being understood that the structure to be protected may be of any other form or of any other metal, such as lead, brass or copper, which is electrically positive to zinc as measured by a voltmeter.

In the system illustrated in Figures 5 and 6, if the wire 4 is cut and a suitable voltmeter is inserted it will, in most of the corrosive soils, indicate a potential of from 0.3 to 0.35 volt with the iron pipe 13 positive to the zinc electrode 1. With the wire 4 intact an electric current flows somewhat as indicated in the diagrams by the arrows and the dotted lines connecting such arrows; that is to say, the current flows from the soil into the pipe 13 in a generally radial direction, as indicated by arrows such as those marked 15, 16 and 17, thence in pipe 13, as indicated by the arrows 18, to the point of connection of the wire 4, thence through the wire, as indicated by the arrow 19, to the zinc electrode 1, thence in the electrode and out of the surface thereof into the soil, as indicated by the arrows 15', 16' and 17', and thence through the soil by devious routes, depending upon varying soil resistivity, somewhat as indicated by the dotted lines connecting the arrows 15—15', 16—16' and 17—17'. Whatever may be the precise distribution of the current in the soil, the inflow of current into the pipe 13 ultimately builds up a back electro-motive force which has been found to vary approximately as the cube root of the current density and which approximates 200 milli-volts with a current density of ten micro-amperes per square inch. The currents flowing in the pipe 13, in the wire 14 and in the zinc electrode 1 cause negligible voltage drops. The flow of the current from the surface of the zinc electrode 1 into the soil is opposed by the soil resistance to an extent depending largely on the diameter and length of the electrode, its depth below the earth surface 14, the diameter and length of the pipe section 13, and the resistivity of the soil. For instance, an electrode one inch in diameter and four feet long with its top two feet below the ground surface and five feet from a piece of 12 inch pipe six feet long offers resistance of approximately five ohms in soil having a resistivity of twenty-five ohms between the faces of a foot cube of soil, which is typical of rather corrosive soil.

The rate of corrosion of the zinc is generally proportional to the density of the current leaving its surface, one milli-ampere per square inch corroding the zinc at the rate of about 0.1 inch thickness per year. While the average run of the soil may have a resistivity of twenty-five ohms between the face of a foot cube, a stratum of soil of low resistance, such as is indicated in Figure 6 by the dotted lines 20—20, is frequently encountered. Such a stratum may have a resistivity of 8 ohms between the faces of a foot cube thereof and as a result the current density at the zinc surface in contact with this stratum will be approximately three times as great as the average. With the dimensions mentioned above for an electrode in soil yielding 0.325 volt of galvanic voltage, a current of about twenty-five milli-amperes (10 micro-amperes on each of 2,500 square inches of pipe) will create a back electro-motive force of 0.200 volt, leaving 0.125 volt to cause the twenty-five milli-amperes to flow through the five ohm circuit resistance. The composite zinc electrode, having about one hundred and fifty square inches of surface, thus will have an outflowing current density of ⅙ milli-amperes per square inch and will corrode at an average rate of approximately 0.017 inch per year. The zinc of the portion of the electrode in the low resistance stratum 20—20 would, however, have an expected rate of corrosion of 0.05 inch per year and if the electrode were not provided with an interior portion or core of iron or of a metal electrically positive to zinc, the electrode would be cut off at the stratum 20—20 long before the zinc of the portion of the electrode extending below the stratum is consumed; and in the event this low resistance stratum occurred near the top of the electrode a large part of the zinc would thus be prematurely lost.

Premature loss of any material quantity of zinc cannot occur in an electrode constructed in accordance with the invention, for the presence of the core or insert of iron or other metal electrically positive to zinc prevents such an occurrence at the expense of trivial zinc losses only. Let it be supposed, for instance, that the loss of zinc at the stratum 20—20 has proceeded until 0.1 square inch of its iron insert is exposed. Upon the iron thus becoming uncovered current will flow from the contacting soil into the iron, thence through metallic contact to the zinc and thence into the soil, thus completing the circuit. If the resistance of this circuit be even as low as zero, only such current will flow as will create a back electro-motive force at the surface of the iron equal to the total galvanic zinc-iron voltage. If this be 0.325 volt the current density will be approximately $(0.325 \div 0.200)^3 \times 10$ micro-amperes per square inch, that is to say, forty-three micro-amperes, which applied to the 0.1 square inch of iron surface exposed gives a total of 4.3 micro-amperes, and this will corrode only about 0.0001 pound of zinc per year. The core of steel or other metal thus will be protected from corrosion where it is exposed at an expenditure of zinc that is quite insignificant as compared with the amount that would otherwise be lost through the cutting off or separation of the electrode into separate parts, and the electrical continuity of the entire zinc electrode is thus preserved.

Having thus described my invention, I claim:

A composite electrode adapted for use in the prevention of corrosion of underground metallic structures, said electrode being of rod-like form and having a zinc tube lined with a tube of metal electrically positive to zinc and provided with means for preventing soil water from coming into contact with the interior of said last named tube, the walls of said zinc tube being of a thickness substantially greater than that of said lining tube, and said tubes being adherently attached substantially throughout the length of said zinc tube, whereby all portions of said zinc tube are maintained in electrical contact with said lining tube even though said zinc tube be severed in a plurality of places.

GEORGE I. RHODES.